United States Patent [19]
Brewer et al.

[11] Patent Number: 5,349,661
[45] Date of Patent: Sep. 20, 1994

[54] INSTALLATION OF AN EXPANDED MEMORY MANAGER

[75] Inventors: James A. Brewer, Leander; Paul R. Habermehl, Round Rock; James M. Stafford, Round Rock; Errol R. Williams, Jr., Round Rock, all of Tex.

[73] Assignee: International Business Machines Corporation, Armonk, N.Y.

[21] Appl. No.: 886,614

[22] Filed: May 20, 1992

[51] Int. Cl.$^5$ ............................ G06F 7/00; G06F 9/44
[52] U.S. Cl. ..................................... 395/700; 395/425; 364/DIG. 1; 364/280; 364/245; 364/245.31; 364/245.4
[58] Field of Search ............... 395/700, 400, 425, 650, 395/375

[56] References Cited

U.S. PATENT DOCUMENTS 4,926,322  5/1990  Stimac et al. ................. 364/200
4,974,151  11/1990 Advani et al. ................. 364/200

OTHER PUBLICATIONS

"Dual Use of Config. Sys Device Driver Installation Line", Research Disclosure, Apr., 1992, No. 336.
IBM TDB, "Method to Install Displaywriter/Personal Computer Attach Program into PC Jr's Limited Memory Space", vol. 28, No. 5, Oct. 1985, p. 2140.
IBM TDB "Personal Computer Extended Memory Card with Direct Memory Access", vol. 30, No. 7, Dec. 1987, p. 175.
IBM TDB "Automatic Unlimited Dynamic Memory Relocation", vol. 31, No. 11 Apr. 1989, p. 178.
IBM TDB "Alternative Paging Access", vol. 32, No. 8B, Jan. 1990, p. 128.
IBM TDB "Emulation of an Expanded Memory Adapter Using a Microprocessor" vol. 32, No. 1, Jun. 1989, p. 381.
IBM TDB "Environment Facility Supporting Logical Device Units", vol. 33, No. 10A, Mar. 1991, p. 384.
IBM TDB "Bootable Installable File System and Remote IPL Method", vol. 34, No. 4A, Sep. 1991, p. 363.
Quarterdeck Expanded Memory Manager 386 User's Guide, 1989, pp. 13, 14, 17, 23, 24 and 29.

Primary Examiner—Kevin A. Kriess
Attorney, Agent, or Firm—Mark E. McBurney

[57] ABSTRACT

An EMM device driver command installation line is provided which may be easily and quickly interpreted by a user, an installation or a setup program. The physical memory is correlated to the installation line by a map of the 16 K-byte DOS memory segments from 0 to the memory segment above 1024 K-bytes. Different characters are assigned to represent the different types of parameters which may be found in DOS memory (0 to 1024 K-bytes), e.g. read only memory (ROM), or video memory. Additionally, characters may represent the page (single 16 K-byte segment and frame (4 sequential pages) locations that are usable by the EMM device driver, and informative to a user. In addition to the type of characters used, the character positions also provide usable information to the user since a one to one correspondence exists between the character position and the physical locations in DOS memory.

16 Claims, 5 Drawing Sheets

BOOT

DOS

CONFIG. SYS

DEVICE=C:\PATH\MOUSE.SYS
    DEVICE=C:\EMM.SYS. DE8 FC0 CD0 . . . . . . .

AUTOEXEC.BAT

BOOT

DOS

CONFIG. SYS

DEVICE=C:\PATH\MOUSE.SYS
    DEVICE=C:\EMM.SYS MMMMMMMMMBBBBVVVVPNNNFFFRR . . . . . . .

AUTOEXEC.BAT

INSTALLATION OF AN EXPANDED MEMORY MANAGER

BACKGROUND OF THE INVENTION

1. Field of the Invention

The present invention generally relates to the installation of device drivers in an information handling system. More particularly, the operating system configuration for managing an expanded memory card is improved such that an operator, or operator assist program can easily determines usable portions of system memory.

2. Description of Related Art

Typically an Expanded Memory Manager (EMM) device driver will be installed using a line placed in a CONFIG.SYS file within the computer operating system, such as the Disk Operating System (DOS). The EMM will then install in different manners depending on information provided, such as /P0000, /FC080, and the like wherein these commands provide information regarding the physical memory locations within the DOS memory area (0–1 Meg) and the manner in which this memory will be used.

A standard CONFIG.SYS file generally includes many arcane and unreadable command parameters. The problem with existing device driver installation lines in the CONFIG.SYS file is that it is incomprehensible to a normal user, i.e. there is no relationship between the characters, or the character positions and the memory locations accessible by the operating system. Further, a great deal of time is required for application software parsing of CONFIG.SYS parameters and a lot of support code is needed, due to the complexity and number of the commands. Additionally, conflicting situations are likely to occur, wherein a single memory area may be duplicated across different commands, and many potential error situations are possible which are difficult to detect.

IBM TDB "Emulation of an Expanded Memory Adapter using a Microprocessor", volume 32, no. 1, June 1989, page 381, discusses using an Intel (Trademark of Intel Corp.) 80286 processor to emulate an expanded memory adapter. This technique uses memory in excess of the first megabyte of real memory, accessible by DOS, to emulate the expanded memory adapter. A part of the real memory can be reserved for use by a move block mechanism. IBM TDB "Alternative Paging Access", volume 32, no. 8B, January 1990, page 128, describes a technique for accessing a page of memory by a paging device, while at the same time prohibiting standard access to that page. The paging operations are performed with translated access (while the page is being read into the memory), but a program application is denied access to the page until it is fully in the memory and renamed. IBM TDB "Automatic Unlimited Dynamic Memory Relocation", volume 31, no. 11, April 1989, page 178, is an algorithm that can be applied to computer systems with expanded memory to provide additional usable memory. A translate table is provided with contents that correlate a particular computer address with a specific byte in the main memory. Thus, by changing the contents of a translate table, the related main memory location is also changed. IBM TDB "Personal Computer Extended Memory Card With Direct Memory Access", volume 30, no. 7, December 1987, page 175, describes a method of eliminating the need to run a CPU in both a real address mode and a virtual address mode. A direct memory access (DMA) memory to memory transfer can be performed, wherein a device driver is called, instead of an interrupt, that will control a specialized DMA extended memory card. The device driver passes the read address, write address and length to the DMA controller, which transfers the data. IBM TDB "Method to Install the Displaywriter/Personal Computer Attach Program Into PC Jr.'s Limited Memory Space", volume 28, no. 5, October 1985, page 2140, discusses a method of installing the Displaywriter/Personal Computer (DWPC) program in a PC Jr. The DWPC is loaded as a device driver which determines the machine type by reading from a memory location. If the machine is a PC Jr., then display refresh scanning is inhibited and the DWPC is moved into the refresh buffer.

The user's guide for the Quarterdeck expanded memory manager—386 (QEMM) product states, at page 14, that portions of memory can be included or excluded from control of the expanded memory manager by specifying the address in hexadecimal numbers of the included or excluded portion. A QEMM.COM program provides a menu (see page 24) that gives a user information that can be used to optimize memory. For example, the expanded memory currently available, types of memory existing in the first megabyte, areas of memory that can be accessed, and the like. It should be noted that QEMM does not provide an easily usable EMM device driver installation line in the CONFIG.SYS file, but presents information through a menu from a separate program.

"Dual Use of CONFIG.SYS Device Driver Installation Line", Research Disclosure, April 1992, No. 336, discloses an installation program that finds, what it considers to be usable portions of memory. Subsequently, an application program may activate a hardware device which would then activate some portion of memory. A user can then look up the memory location on the device that is used by the application and record the location on the EMM device driver installation line in the CONFIG.SYS file such that the EMM driver will not use the same memory.

U.S. Pat. No. 4,926,322 describes an expanded memory manager that provides expanded memory without additional hardware if extended memory is available. This expanded memory manager is a DOS device driver that searches for memory in the RAM. This device driver is structured according to the LIM specification. U.S. Pat. No. 4,974,151 generally discusses configuring devices in an open computer system.

It can be seen that the cited prior art generally relates to the installation and operation of an expanded memory and lacks any user friendly installation techniques in the device driver installation line. Therefore, it can be seen that a means of installing an expanded memory manager device driver which will provide a user with relevant, usable information, and ensure that memory locations will not be duplicated and errors are minimized would be very desirable.

SUMMARY OF THE INVENTION

In contrast to the prior art, the present invention provides an EMM device driver command installation line which may be easily and quickly interpreted by a user, an installation program or a setup program. EMM device drivers operate on boundaries of 16 K-byte segments of memory which allow a string of characters to be used as the device driver installation line, in the CONFIG.SYS, file that represent the DOS physical memory map. That is, the physical memory address is correlated to the installation line by a map of the 16 K-byte memory segments from 0 to the expanded memory segment above 1024 K-bytes.

Different characters are assigned to represent the different types of parameters which may be found in DOS memory (0 to 1024 K-bytes), e.g. read only memory (ROM), video memory, or the like. Additionally, characters may represent the page (single 16 K-byte segment and frame (4 consecutive pages) locations that are usable by the EMM device driver, and informative to a user. It should be noted that in addition to the type of characters used, the character positions provide a one to one correspondence to the physical page locations in DOS memory. Generally, there will be 65 character positions in the installation line with 0 to 63 representing DOS memory and the 65th character representing the expanded memory portion (greater than one megabyte) which will store the expanded memory manager, if possible. Thus, an installation line for an EMM device driver is provided that allows a user to understand and reconfigure the various physical memory segments.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
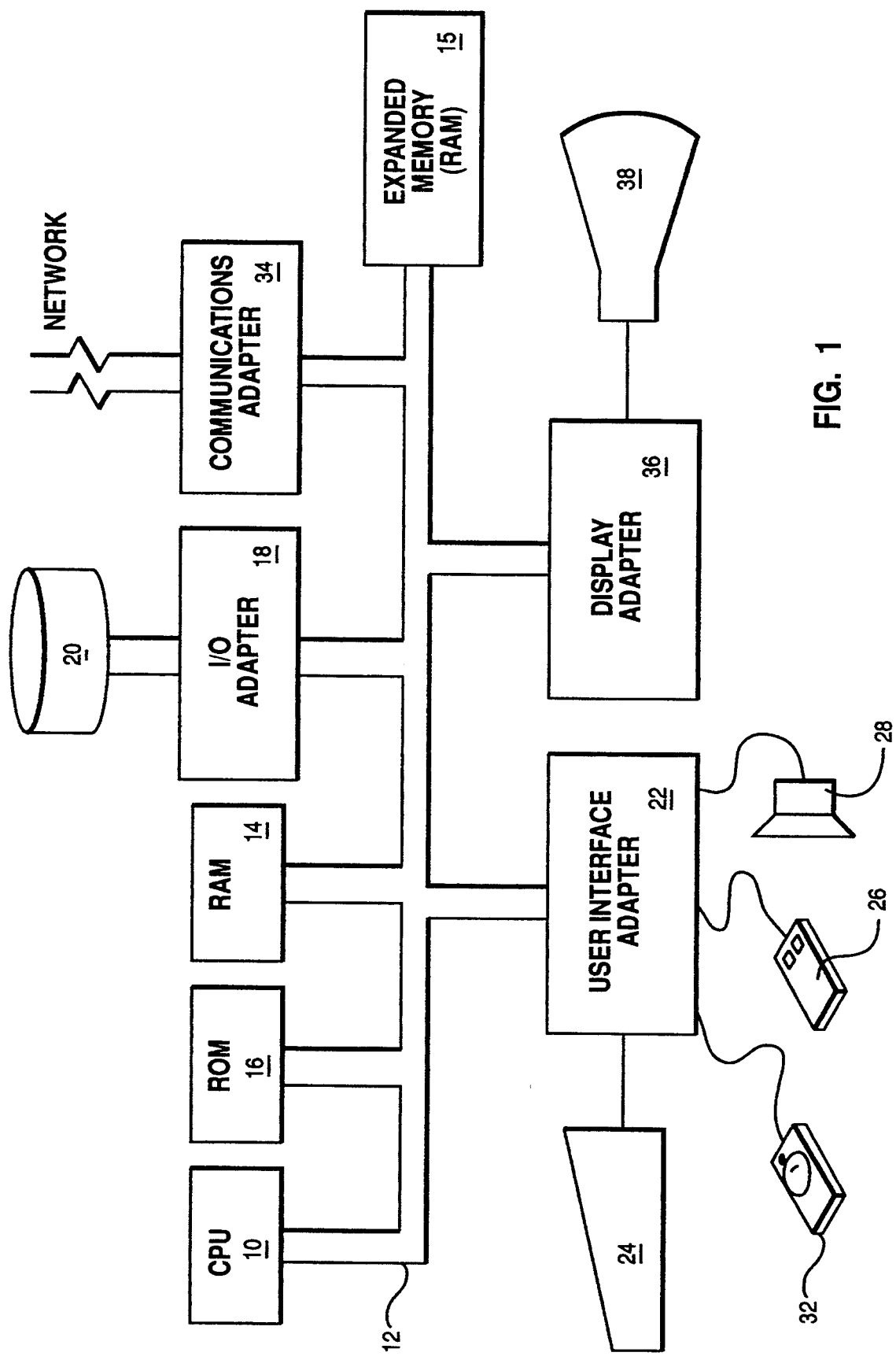
FIG. 1 is a schematic diagram representing hardware components of a typical data processing system.
Figures 4, 5, 6:
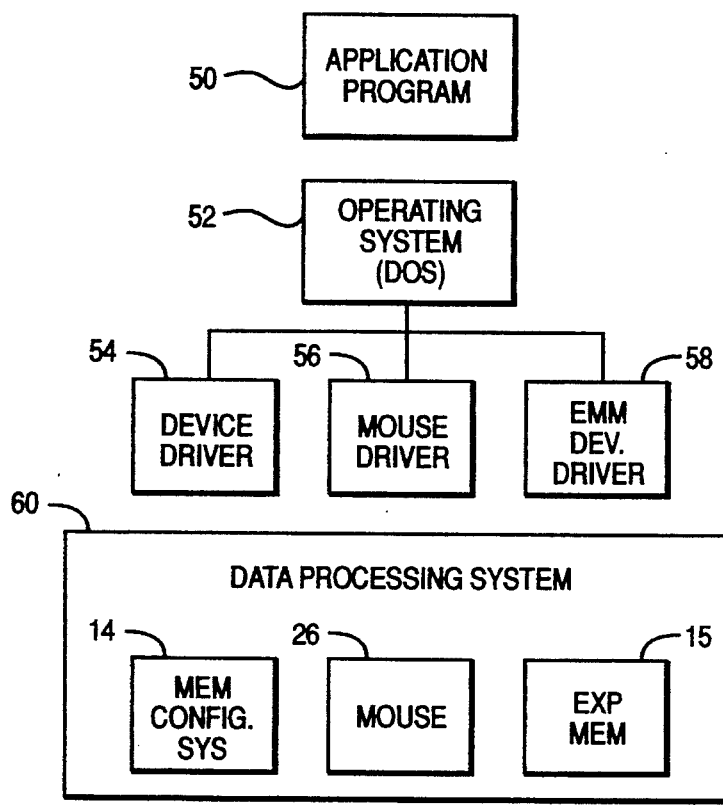
FIG. 4 is a block diagram of the hardware and software components of the present invention.
FIG. 5 is a diagram showing the syntax of a typical device driver installation line.
FIG. 6 is a diagram of a device driver installation line in accordance with the present invention that can be displayed such that a user (or user friendly configuration program) can understand the areas of physical memory and their designated function.

Referring to FIG. 1, a typical data processing system is shown which may be used in conjunction with the present invention. A central processing unit (CPU), such as one of the Intel X86 processors is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. Expanded memory 15 is additional RAM added to the data processing system and is also shown interconnected to bus 12. Expanded memory 15 is generally a circuit card that includes multiple single in line memory modules (SIMMs) along with corresponding registers capable of being written to by the an device driver 58 (FIG. 4). I/O adapter 18 may be a small computer system interface (SCSI) adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboard 24, track ball 32 or mouse 26 and receiving output from the system via speaker 28 and display 38. Additionally, the operating system such as DOS or the OS/2 system (OS/2 is a Trademark of IBM Corporation) is used to coordinate the functions of the various components shown in FIG. 1.

Figure 2:
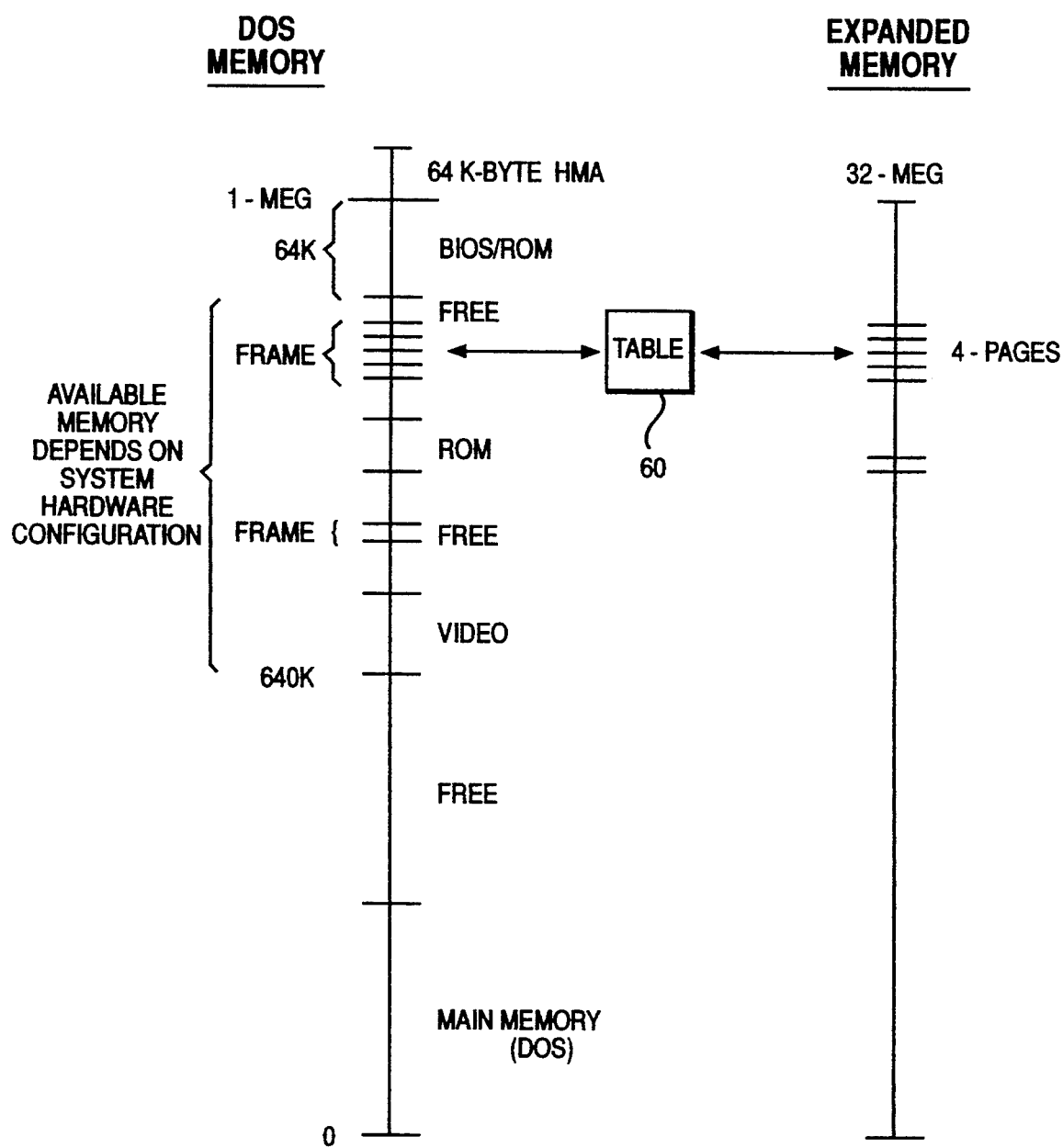
FIG. 2 is map of the physical memory of a typical information handling system contemplated by the present invention.

FIG. 2 is a map of the physical memory locations in a typical computer using the DOS operating system. DOS is capable of addressing one megabyte of memory. It can be seen that the addressable one megabyte of memory is allocated between various functions within the computer system. A first portion is allocated for storing and use of the DOS operating system with an additional portion being held free for subsequent memory requirements. This first free portion will vary in size depending upon the needs of the DOS system. Typically, this free portion will be approximately 640 K-bytes, less the amount of memory required for DOS. The DOS operating system itself may require approximately from 30 to 100 K-bytes of memory depending on the version and number of device drivers supported. The video memory requirements of the computer system are then accounted for, which includes memory needed to display images on display 38 such as required by a frame buffer, bit map, character generator, or the like. Generally, the video portion starts at around 640 K-bytes, depending on the type of graphics supported by the system, e.g. VGA, super VGA. A free portion is reserved for use in subsequent processing above video memory and ROM 16 has also been allocated a portion of system memory. Another free portion is then designated above the ROM portion and the BIOS (which requires approximately 64 K-bytes) stored in ROM 16 (FIG. 1) is designated as the final portion of the addressable one megabyte memory in a DOS system. It should be noted that the portion of the one megabyte memory, addressable by DOS, above 640 K-bytes but below one megabyte will vary depending on the system hardware configuration, e.g. if a hard disk controller is present less memory will be available above 640 K-bytes. Since DOS can only address memory within this one megabyte range, when additional memory is added by expanded memory 15 (FIG. 1), a controller is required to map the expanded memory into and out of the one megabyte range. Generally, the hardware expanded memory card is provided for the computer system such that the memory in excess of one megabyte can be transferred into the one megabyte addressable range and addressed such that information can be stored therein. This memory transfer is accomplished through the use of a mapping table 60 that is set up by the EMM device driver. More particularly, the expanded memory can be up to 32 megabytes and is mapped into the one megabyte DOS memory by four consecutive pages (16 K-bytes), which transfer into the DOS memory as frames. This information is then mapped back into the expanded memory and can be used when recalled by a subsequent mapping operation. One of the memory units for mapping the segments of memory is a page which is defined as a 16 K-byte block of EMM usable memory as shown in FIG. 2. A frame is another unit of memory locations and is defined as four consecutive pages which is effectively a 64 K-byte segment of memory. The EMM device driver 58 is required in order to correlate the mapping of pages of memory between the one megabyte memory that is addressable by DOS and the expanded memory 15 (FIG. 1).

The EMM device driver 58 (FIG. 4) performs this mapping function by writing to a set of registers included on expanded memory 15 to load an additional address for each register's corresponding discrete amount of memory such that memory segments of the expanded memory 15 can be accessed either directly by writing to the actual physical expanded memory address, or by writing to the additional address corresponding to a mapped address within the one megabyte memory range accessible by DOS. In this manner, the additional memory of expanded memory 15 is mapped into and out of the one megabyte DOS addressable memory, thereby effectively enabling DOS to access more than one megabyte of RAM. Further, the EMM device driver 58 will write to the aforementioned register on expanded memory 15 upon receiving an interrupt request from CPU 10. That is, once the EMM device driver 58 (FIG. 4) is installed, it then begins its memory mapping functions upon receipt of an interrupt to the processor 10 (FIG. 1), which is acting in response to a request from a program application 50. Use of many commercially available EMM device drivers is contemplated by the present invention, such as a 1 to 32 megabyte expanded memory card and corresponding device driver commercially available from the IBM Corporation and other vendors.

The present invention provides a novel method of installing the EMM device driver and controlling expanded memory 15 such that a user is capable of readily determining the amount of available memory locations in the one megabyte memory recognizable by DOS, and how that memory is currently being utilized.

Figure 3:
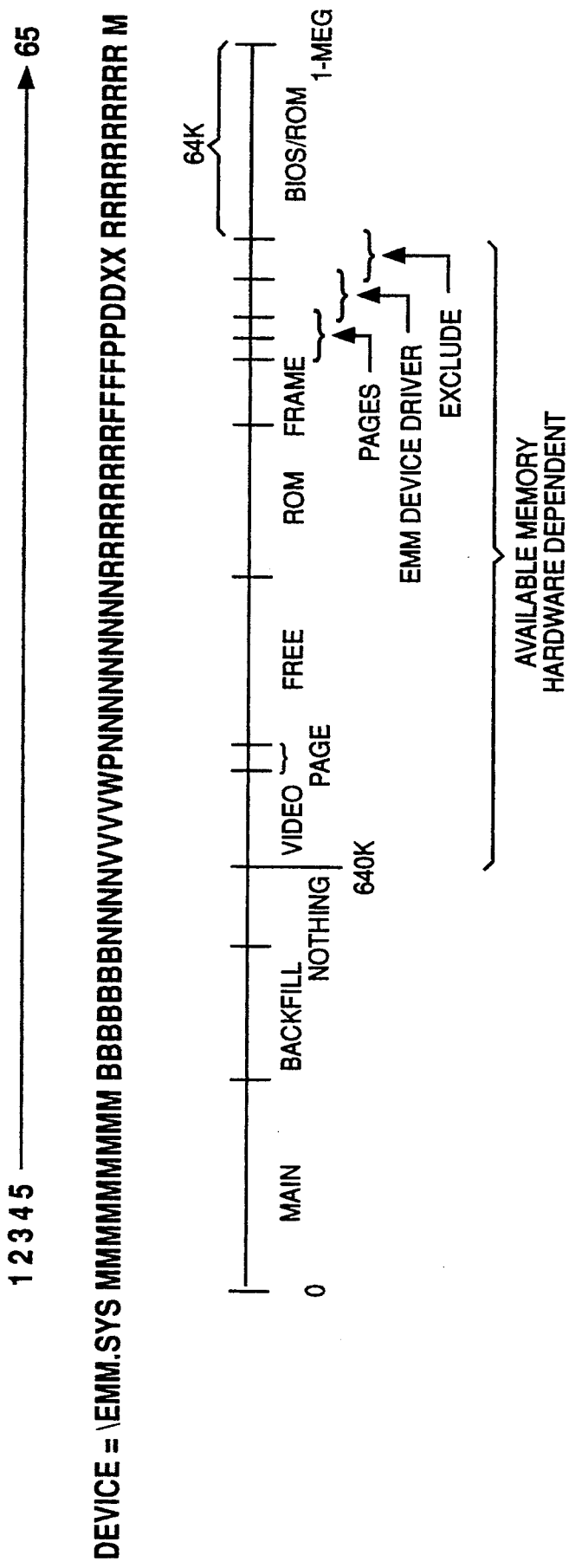
FIG. 3 is a diagram showing the correlation between the installation line of the present invention and the physical memory map.

FIG. 3 illustrates the relationship between the EMM device driver installation line of the present invention and the map of physical memory shown in FIG. 2. It can be seen that the EMM.SYS installation line includes characters corresponding to the various allocated memory portions of the one megabyte memory addressable by DOS. Not only do the character positions correspond to specific memory locations, the type of character displayed informs the user of the type of functions allocated to that portion of memory. The string of characters in the installation line is 65 characters long where the first 64 characters represent a 16 K-byte memory page and provide information needed to install EMM device driver 58. The 65th character represents a 64 K-byte high memory area (HMA) above one megabyte, that is also addressable by DOS. As stated above, the different characters are chosen to represent different items within the DOS memory map. For example, some of the information provided by the present invention is not usable by EMM device driver 58, but is informative to the user and/or a setup program which may install the device driver automatically. That is, how the memory is allocated is of interest to the user and the setup program. It should be noted that the functions represented by the characters will, to a certain extent, be dependent on which version of the Lotus-Intel-Microsoft (LIM) memory specification a user's program application is written for.

M Represents existing memory for the general system, i.e. that portion of memory wherein the DOS operating system and program applications are stored (RAM).

B A command to backfill that portion of the accessible one megabyte memory that is located below the video memory portion. Backfill is used to allow: (1) certain application code to be transferred between the system memory and expanded memory to aid performance; or (2) allocate space to bring system memory up to 640 K-bytes, when additional memory is added.

V Video memory, that portion of the memory that is reserved for the video functions, such as a display bit map, or the like.

R ROM, that portion of the memory allocated for the read only memory that will include the system BIOS.

N Nothing found, i.e. this particular memory location is empty.

X Exclude, this page is excluded from EMM usable locations. This excluded page may be occupied by a device driver with "hidden memory". A user must actively tell the system (through the setup program or by editing the CONFIG.SYS file) to exclude certain addresses.

Other designated areas in memory are usable by the EMM device driver as well as being informative to the user and setup programs.

D Page in memory where the EMM device driver can be placed in order to conserve DOS memory. That is, the EMM device driver is not placed in the DOS application/program memory area so the DOS memory which would have been used by the EMM device driver is now available to user applications.

F Frame, four consecutive pages (64 K-byte of four 16 K-byte pages) that is usable by the EMM device driver.

P Page, single 16 K-byte segment that is usable by the EMM device driver.

It can be seen that in order to maintain the one to one corresponding relationship between characters in the installation line and pages in memory, four consecutive F characters will be found together to represent four pages of usable memory by the EMM device driver 58. Additionally, in a preferred embodiment the EMM device driver was found to require 20 K-bytes of memory and thus two pages of memory were required to store the EMM driver in the one megabyte addressable storage. Therefore, it can be seen from FIG. 3 that two pages in the memory map beneath the BIOS/ROM area have been designated with the characters ("D") indicating placement of the EMM device driver therein.

It should be noted that a 65th character is included in the installation line of the present invention which represents the expanded memory capability that will be present when system memory is increased. The 65th character represents a high memory area, approximately 64 K-byte segment and will allow the entire EMM device driver to be hidden from the DOS memory map if this HMA segment is available as RAM and the user decides to direct the device driver to load at that location. In most cases, a section of general memory (RAM) is located in this area, as indicated in FIG. 3 by the presence of the character M (RAM-general memory) at this 65th character position. Since this area is not a complete 64 K-byte segment, it cannot be used for EMM pages because four consecutive pages (Frame) are required for mapping. This section of memory may remain empty, and in this case, the character N (nothing) will be present at the 65th character position. Thus, the HMA location will either be general memory or nothing. It can be seen that, the 65th character represents more than a single page of memory, but less than a frame and is an exception to the one character to one page corresponding relationship of the previous 64 characters. Of course, the high memory location could have been represented by four characters approximately corresponding to 16 K-byte page each, but a single character was chosen because the physical nature of the HMA area is different from other DOS memory, because it actually contains slightly less than 64 K-bytes and is used by many other device drivers and program applications. The configuration line shown in the FIG. 3 may be directly read into an array by the EMM device driver. This array directly describes the physical memory being used by the EMM device driver and will be used to control the memory operations of the data processing system. That is, the memory mapping function between the one megabyte memory, addressable by DOS, and the expanded memory will be controlled by the CONFIG.SYS installation line. Again, the type of application used and its compatibility with a specific version of the LIM specification will determine the characters in the EMM device driver installation line.

It should be noted that the only parsing code required to interpret the EMM install command line shown in FIG. 3 is that which deciphers what is represented by the D, F and P characters, i.e. that memory usable by the EMM device driver. It will be understood by those skilled in the art that parsing is the analysis of operands entered with a command to create a parameter list for the processor from this command. It can be seen that no parsing code is required to determine parameter addresses since the command line of FIG. 3 directly represents, in a one to one correspondence, what function is contained in each 16 K-byte area of memory, and how these 16 K-byte memory areas can be used. Further, it should be noted that the command line of FIG. 3 can be easily generated and interpreted by a user. However, this command line is typically created by an installation program to provide a consistent user interface across multiple related programs.

FIG. 4 is a block diagram illustrating the interrelationship between the hardware and software components of the present invention. An application program 50 runs in conjunction with the DOS operating system 52 which includes various device drivers 54, examples of which are mouse driver 56 and EMM device driver 58. After their installation by an installation command line in a CONFIG.SYS file stored in memory 14, drivers 54, 56 and 58 control corresponding hardware devices (mouse 26, expanded memory 15, or the like) located in the data processing system 60 (FIG. 1). The user may access the operating system 52 directly or through application 50 depending on the particular functions to be implemented. It should be noted that the installation line shown in FIG. 3 will remain constant each time the system is booted, unless the installation line is altered by the setup program or user. Upon initial installation of the expanded memory hardware, the setup program or user will configure the installation command line of FIG. 3 as desired, and place the command line in the CONFIG.SYS file used by the DOS operating system. Thus, upon initialization of the system, i.e. turning the power on, the device driver is installed without further user interaction. It is only when a different configuration is desired that a user will access the device driver installation line to make changes.

FIG. 5 shows a sequence of events that occur during the booting of a system when the power on self test (POST) occurs. Initially the system is booted and DOS is accessed and calls the CONFIG.SYS file prior to completion of the installation. It can be seen that several device driver installation commands may be present in the CONFIG.SYS file. In the example of FIG. 5, a mouse driver is installed prior to the EMM device driver. It can be seen in FIG. 5 that conventional hexadecimal memory location identifiers are shown in the installation command line and that this type of information is essentially unusable by all but the most sophisticated users. In contrast, FIG. 6 shows the same sequence of events wherein the system is booted, DOS is accessed and the CONFIG.SYS file is called which again contains two device drivers. It can be seen in FIG. 6 that the EMM device driver installation line includes characters having a one to one correspondence with the 16 K-byte memory segments and which indicate the functions allocated to the particular memory locations. In comparing the EMM device driver installation line of FIGS. 5 and 6 it is readily apparent that even unsophisticated users can obtain valuable information regarding EMM device driver 58 from the characters and their relative position in the installation line. A major enhancement of the present invention is that the installation line eliminates the possibility of errors and conflicting parameters. The installation line also requires very little code and time to parse.

Figure 7:
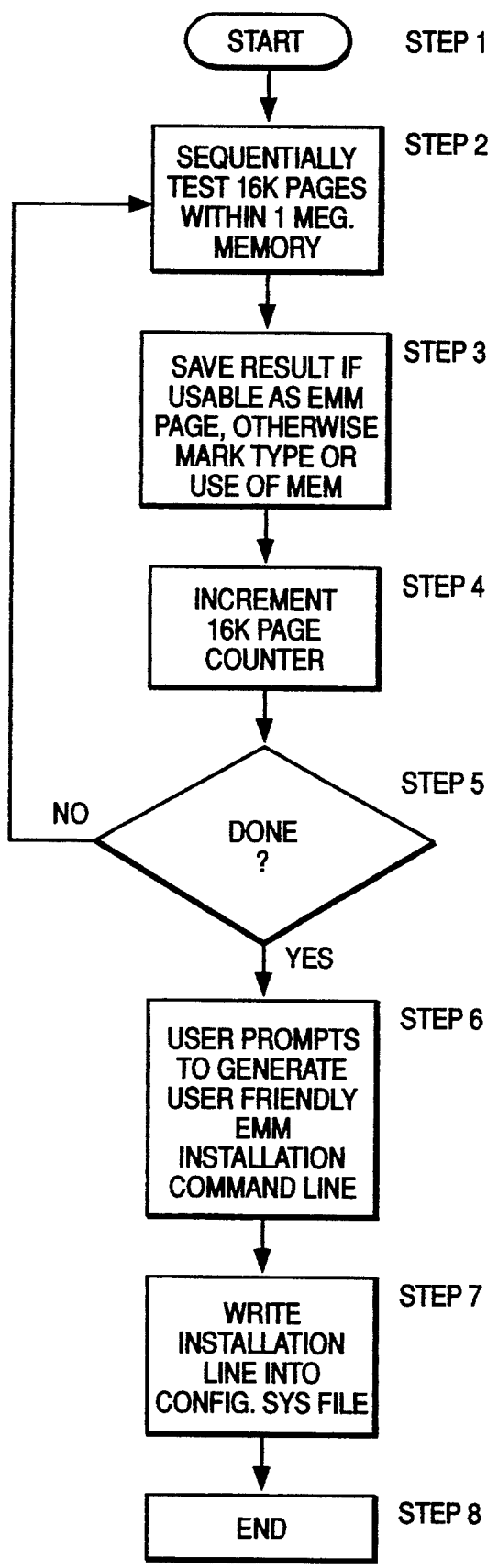
FIG. 7 is a flow chart of the process for installing the installation line of the present invention into a CONFIG.SYS file in the system operating system.

FIG. 7 is a flowchart that represents the steps required for either a setup program or a user to configure the EMM device driver installation line as desired. Step 1 starts the process while at step 2 the 16 K-byte page segments in the one megabyte memory accessible by DOS are sequentially tested to determine their corresponding function. This test will determine which pages are usable by the EMM driver. First, the memory addresses are read to see if the value initialized by the power on self test (POST) is present. Subsequently, each memory location is written to and read back to see if the same data is present. If the data read is identical to the written data on two occasions, then the memory is assumed to be usable. However, if the data read is different, but read in a repeatable pattern, then ROM has been found. If data read is different, and is not read in a repeatable pattern, then it is likely that some type of memory mapped hardware (e.g. device driver) is present and the memory location is unusable. It should be noted that if a single memory location is determined to be unusable, then the whole page is unusable, since a page is the smallest unit that can be mapped to. The results of each 16 K-byte page test are saved by the installation program at step 3, if the pages are usable as an EMM page, i.e. the page is subject to mapping, otherwise the pages are marked with the type or use of data stored therein for subsequent identification on the installation command line. The test results are stored in memory on a list that is built as the pages are tested. That is, each time a page is tested, the results are added to the list. At the completion of the test, the user then must decide whether to save the usable pages in the CONFIG.SYS file or another file. A block counter is then incremented in step 4 such that the next succeeding 16 K-byte page of memory can then be addressed and tested. At step 5 it is determined whether all 16 K-byte pages have been tested and if not, the process returns to steps 2–4 until all testing is completed. Subsequent to testing of the one megabyte addressable memory portion, user prompts are displayed to create the installation command line of the present invention. These prompts ask a user such questions as whether to generate the installation command line? Install the command line in the CONFIG.SYS file? Change system configuration? (used when new hardware is added to a system). Once the installation command line is created it is then capable of being understood and modified directly by the system user with a suitable editing program. The command line will be similar to that which is shown in FIG. 3 and will explain the configuration of the one megabyte addressable memory by displaying characters, in positions directly related to discrete memory locations, that represent these memory locations and functions that may be stored therein. For example, a user may designate a specific section of memory for exclusion (character X), or use by EMM device driver 58 (characters F,P), place the EMM device driver within the unused memory (character D), install the EMM device driver in the HMA location, or the like. Once the user is satisfied with the allocation of memory, the installation line is written in the CONFIG.SYS file used by the DOS operating system, at step 7. Once the installation line is written into the CONFIG.SYS file, the device driver will be installed according to this installation line each time the system is booted, unless the user chooses to reconfigure the one megabyte memory portion of the data processing system by changing the EMM device driver installation line. The process of FIG. 7 will be used (rerun) each time a user desires to change the setup procedures or the system hardware configuration. Generally, a user will change the setup options only when the system has changed, e.g. a memory card is added, or deleted or other system components are desired to be ignored. Subsequent to the installation of the command line in the CONFIG.SYS the process ends at step 8.

It can be seen that a user friendly EMM device driver installation line and method of creating this line is provided by the present invention. This installation line will allow a user to have access to understandable information in order to make intelligent decisions regarding the allocation of memory resources within the data processing system.

Although certain preferred embodiments have been shown and described, it should be understood that many changes and modifications can be made therein without departing from the scope of the appended claims.

What is claimed is:

1. A data processing system having expanded memory including a system memory and corresponding memory map and an installed expanded memory device having a capacity beyond said system memory, comprising:

means for checking said memory map for a status of all discrete addressable locations in said system memory; and means for installing an expanded memory device driver using an installation command line;

means for identifying a plurality of different characters that occupy positions in said command line as directly corresponding to said discrete addressable locations in said system memory; and means for indicating a status of said system memory by representing an associated function of the data processing system allocated to said discrete addressable locations with each of said characters.

2. A system according to claim 1 wherein said discrete system memory locations are capable of storing sixteen K-bytes of data.

3. A system according to claim 2, further comprising means for providing access by said data processing system to said expanded memory by mapping portions of said expanded memory into said addressable system memory locations.

4. A system according to claim 1 wherein said means for checking comprises:

means for sequentially testing said discrete locations of system memory to determine if a particular type of function for said data processing system is allocated thereto; and means for storing results of said testing if any of said discrete locations of memory are not allocated for a function of said data processing system.

5. A system according to claim 4 wherein said means for testing comprises:

means for identifying said discrete memory locations that are not allocated for a function of said data processing system with a specific character: and means for identifying said discrete memory locations that are allocated for a function of said data processing with a character, other than said specific character, based upon said allocated function.

6. A system according to claim 5 further comprising means for creating said installation command line based upon said results.

7. A system according to claim 6 wherein said means for creating comprises:

means for positioning said specific character and said other characters based upon a physical address of said discrete memory location; and means for displaying said installation command line such that said command line can be directly modified by said user.

8. A system according to claim 7 further comprising means for storing said device driver installation command in a configuration file within said system memory for use by an operating system running on and controlling the operations of said data processing system.

9. A method of expanding memory in a data processing system including a system memory and corresponding memory map and an installed expanded memory device having a capacity beyond said system memory, said method comprising the steps of:

checking, by the data processing system, said memory map for a status of all discrete addressable locations in said system memory; and installing, by said data processing system, an expanded memory device driver using an installation command line;

identifying a plurality of different characters occupy positions in said command line as directly corresponding to said discrete addressable locations in said system memory; and indicating a status of said system memory by representing an associated function of the data processing system allocated to said discrete addressable locations with each said character.

10. A method according to claim 9 wherein said discrete system memory locations are capable of storing sixteen K-bytes of data.

11. A method according to claim 10, further comprising the step of providing access by said data processing system to said expanded memory by mapping portions of said expanded memory into said addressable system memory locations.

12. A method according to claim 9 wherein said step of checking comprises the steps of:

sequentially testing said discrete locations of system memory to determine if a particular type of function for said data processing system is allocated thereto; and storing results of said testing if any of said discrete locations of memory are not allocated for a function of said data processing system.

13. A method according to claim 12 wherein said step of testing comprises the steps of:

identifying said discrete memory locations that are not allocated for a function of said data processing system with a specific character; and identifying said discrete memory locations that are allocated for a function of said data processing with a character, other than said specific character, based upon said allocated function.

14. A method according to claim 13 further comprising the step of creating said installation command line based upon said results.

15. A method according to claim 14 wherein said step of creating comprises the steps of:

positioning said specific character and said other characters based upon a physical address of said discrete memory locations; and displaying said installation command line such that said command line can be directly modified by said user.

16. A method according to claim 15 further comprising the step of storing said device driver installation command in a configuration file within said system memory for use by an operating system running on and controlling the operations of said data processing system.

* * * * *